Figure 1:
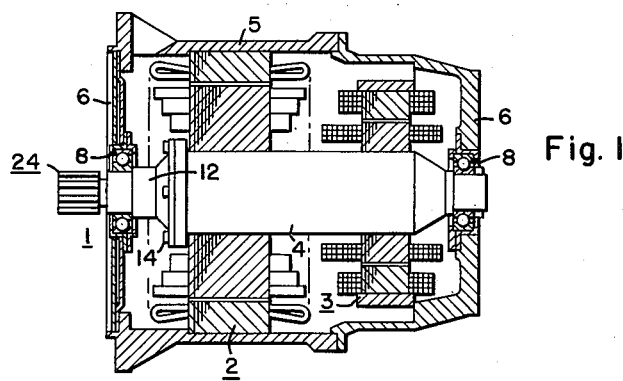

3,005,323
GENERATOR DRIVE SHAFT ASSEMBLY

Leroy C. Carter, Lima, and Larry D. Creeger, Orange Township, Hancock County, Ohio, assignors to Westinghouse Electric Corporation, East Pittsburgh, Pa., a corporation of Pennsylvania
Filed Feb. 19, 1959, Ser. No. 794,355
2 Claims. (Cl. 64—9)

The present invention generally relates to generator drive shaft assemblies, and more particularly relates to an assembly for joining an alternating current aircraft generator to its driving means.

Alternating current aircraft generators are quite often driven by a variable input-constant output speed hydraulic drive connected between the generator and the airplane engine. Such a drive is necessary to obtain a constant speed of the alternating current generator so that the generator will provide an electrical output of constant frequency. The drive shaft assembly connecting the drive and generator together has usually comprised a unitary shaft secured to the generator rotor and splined directly into an internally splined member in the hydraulic drive. Such an assembly creates difficult problems, however, such as the transmission of linear vibrations to the generator and excessive spline wear. One source of such wear is the linear vibration generated in the usual type of constant speed hydraulic drive, which vibration is transmitted to the generator by the drive shaft assembly. Another source of spline wear is the vibration generated in both reciprocating and turbine aircraft engines by rotating parts, reciprocating parts, and aerodynamic forces.

The usual constant speed hydraulic drive employs variably displaced pistons which compensate for changes in speed of the airplane prime mover. Linear vibration is generated by the pulsating loading of the pistons, the inherent dynamic unbalance of the rotating mass present when variable displacement pistons are used, and by the rotating force vectors of the piston loading. Since the source of such linear vibration is located within the hydraulic drive it is desirable to minimize the transmission of such linear vibration to the driven generator.

Linear vibration can also cause excessive wear in the drive shaft assembly which joins the alternating current generator to the hydraulic drive. The result is increased maintenance and shortened life, which is highly undesirable. Another aggravating factor which may increase wear of the drive shaft assembly is misalignment between the hydraulic drive and the generator.

The principal object of our invention is to provide an assembly for joining an electric generator to a hydraulic driving mechanism, which assembly greatly reduces the effect of linear vibration upon spline wear.

Another object of our invention is to provide an assembly for joining an alternating current generator to its driving mechanism, which assembly is capable of compensating for a major portion of the possible misalignment between the generator and the driving mechanism.

Another object of our invention is to provide an assembly for joining an alternating current generator to its driving mechanism, which assembly reduces inertia forces acting upon the drive splines.

Another object of our invention is to provide an assembly for joining an alternating current generator to its driving mechanism, which assembly contains a grease reservoir to adequately lubricate itself.

Figure 2:
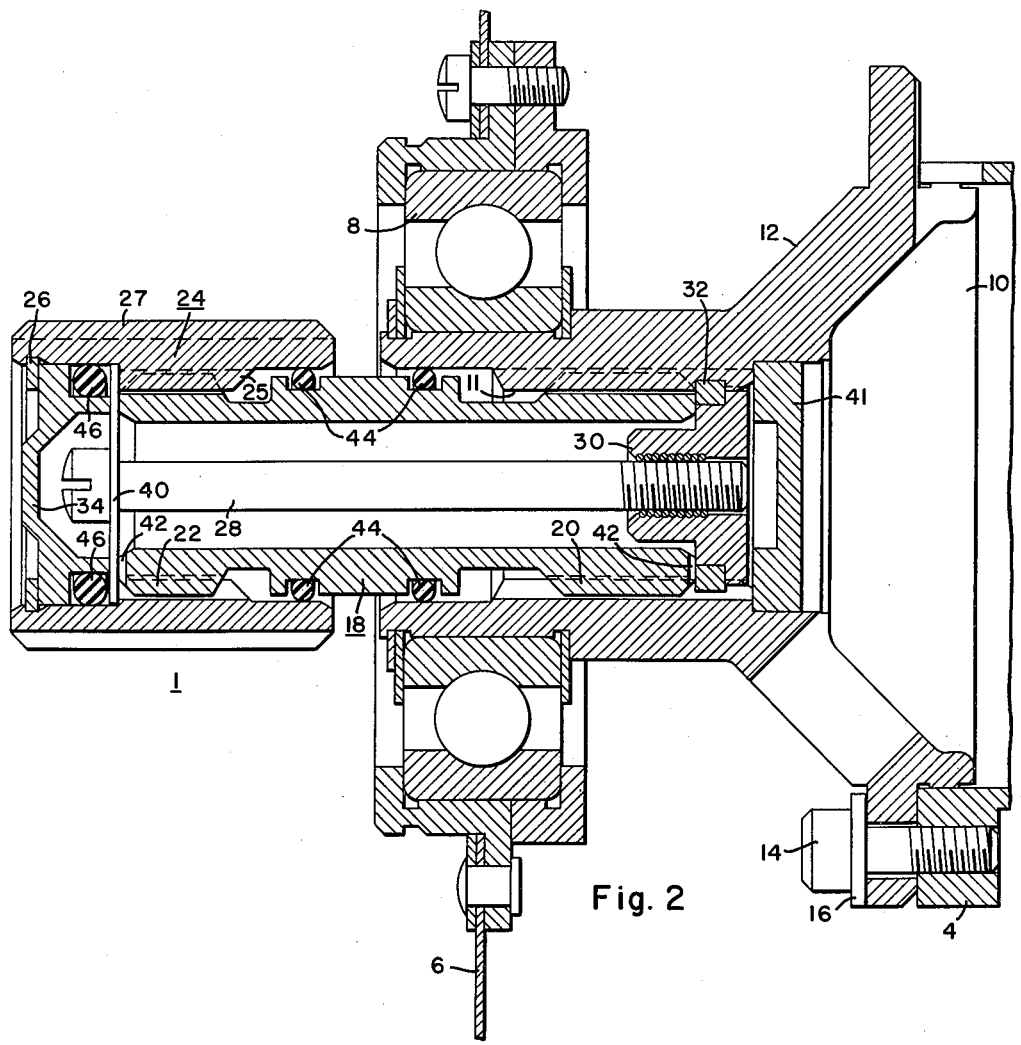

Further objects and advantages of our invention will be seen from the following detailed description, taken in connection with the accompanying drawing, in which:

FIGURE 1 is a side elevation view, partly in longitudinal section, of an alternating current aircraft generator with a drive shaft assembly embodying our invention; and FIG. 2 is an enlarged longitudinal section view of the drive shaft assembly.

The invention is shown embodied in a generator drive shaft assembly 1 connected to an alternating current aircraft generator 2 having an integral exciter 3 on the same shaft 4 as the generator 2. The generator 2 and its exciter 3 are contained in a stator housing 5 enclosed at each end by end brackets 6 and may be of any desired type and construction. Anti-friction bearings 8 positioned in the end brackets 6 rotatably support the shaft 4. A relatively short, torsionally stiff stub shaft 12 is bolted to one end of the shaft 4 by means of bolts 14 and lock washers 16. The stub shaft 12 is positioned and rotatably supported by the bearing 8 at the drive end of the generator 2.

As mentioned previously, the excessive spline wear experienced in certain aircraft alternating current generators connected to constant speed hydraulic drives, or directly to the aircraft engines, is caused to a large extent, by linear vibration. In the conventional arrangement for connection between the drive and the generator 2, a unitary shaft is splined directly into the hydraulic drive. Such an arrangement has proven unsatisfactory, however, since linear vibration and misalignment between the drive and the generator cause excessive wear of the generator drive shaft assembly.

In accordance with our invention, the stub shaft 12, which is secured at one end to the shaft 4, is made hollow and has a splined interior surface 11. A hollow, generally cylindrical spindle 18 is splined at each end on its outer surface, as indicated at 20 and 22. The splined section 20 is engaged in the internally splined stub shaft 12, as shown, to effect a driving connection. The splined opposite end 22 of the hollow spindle 18 engages an internally splined intermediate or collar member 24. The outer surface of the collar member 24 is also splined, as indicated at 27, to engage the hydraulic drive mechanism (not shown) which drives the entire drive shaft assembly 1.

In operation, a driving torque is received from the hydraulic drive by the collar member 24 and transmitted internally to the splined end 22 of the spindle 18 which, in turn, causes rotation of the stub shaft 12 by means of the spline fit at the opposite end 20 of the spindle 18.

An externally splined nut 30 is held, by an inner snap ring 32, within the stub shaft 12 at one end of the hollow spindle 18. An axially disposed bolt 28 extending through the hollow spindle 18 is threaded into the splined nut 30. The bolt 28, by means of a washer 40, holds the spindle 18 in place. A spindle cover 34 contains the assembly at the drive end of the spindle and protects the axially disposed bolt 28. An outer snap ring 26 retains the spindle cover 34 in place.

The spindle 18 performs two important functions. The two splined connections at opposite ends of the spindle absorb a considerable part of any misalignment between the generator and the drive. Such misalignment is usually unavoidable and results from normal machining tolerances plus any additional dynamic misalignment which may result from deflection of parts due to the vibration and rotating force vectors within the hydraulic drive mechanism. The spline connection between the spindle 18 and collar member 24 separates the mass of the relatively large collar member from the spindle and thus reduces the vibratory forces and associated motion, as compared to a unitary construction, since the inertia of the vibrating elements is reduced. This materially reduces wear in the assembly and reduces any fretting corrosion that might occur due to relative motion of the parts.

The hollow spindle 18 also provides a grease lubricant reservoir. This reservoir is desirable since some of the best greases for this application are very soft and are difficult to retain within the drive shaft assembly. The spindle cover 34 has an annular recess in its outer periphery and an O-ring 46 is positioned in the recess between the spindle cover and the collar member 24 to form a lubricant seal at one end of the hollow spindle 18. A sealing washer 41 is locked against a shoulder within the stub shaft 12 to provide a lubricant seal at the other end of the spindle 18. The interior of the hollow spindle forms a reservoir and is filled with grease. A plurality of radially extending grease passageways 42 are cut in both end faces of the hollow spindle 18. The passageways 42 are made of sufficient cross-sectional area to allow the centrifugal force generated by the rotating spindle 18 to feed the grease from the reservoir to the splines at each end of the spindle. O-rings 44 between the stub shaft 12 and the spindle 18, and between the collar member 24 and the spindle 18, prevent lubricant from leaking to the outside of the drive shaft assembly 1. Since spline wear, and particularly fretting corrosion, is accelerated by the presence of air and by the presence of wear products, the extra grease from the reservoir will reduce wear by carrying away the wear products and by excluding air from the wearing surfaces of the splined connections.

Thus, our invention provides a considerable degree of flexibility in the interconnection of a constant speed drive mechanism and an aircraft generator. The added flexibility helps to absorb the small amount of unavoidable angular and parallel misalignment between the generator and the hydraulic drive, while the separation of the mass of the large splined driving member from the driven parts reduces wear of the splined connections, as previously explained. The adequate lubricant reservoir and means for providing the continuous lubrication of the splined connections reduce any tendency to fretting corrosion in the spline connections as well as providing greatly improved lubrication of the splines.

While our invention has been described with a certain degree of particularity, it is to be understood that all equivalents, modifications and alterations within the spirit and scope of our invention are herein meant to be included.

We claim as our invention:
1. A drive shaft assembly including a hollow rotatable shaft, a hollow spindle member disposed with one end extending into said hollow shaft, the shaft and said one end of the spindle member having interengaging splines to effect a driving connection, a hollow collar member extending over the other end of the spindle member and longitudinally spaced from the shaft, the collar member and said other end of the spindle member having interengaging splines to effect a driving connection, the spline connections between the shaft and the spindle member and between the spindle member and the collar member permitting some misalignment, said hollow spindle member containing lubricant, means at each end of the spindle member for permitting lubricant to flow to the interengaging splines, means for holding the shaft, spindle member and collar member in assembled relation, and means on the collar member for effecting a driving connection thereto.

2. A drive shaft assembly including a hollow rotatable shaft, a hollow spindle member disposed with one end extending into said hollow shaft, the shaft and said one end of the spindle member having interengaging splines to effect a driving connection, a hollow collar member extending over the other end of the spindle member and longitudinally spaced from the shaft, the collar member and said other end of the spindle member having interengaging splines to effect a driving connection, the spline connections between the shaft and the spindle member and between the spindle member and the collar member permitting some misalignment, said hollow spindle member containing lubricant, radial passage means at each end of the spindle member for permitting lubricant to flow to the interengaging splines, sealing means between the collar member and the spindle member and between the shaft and the spindle member for preventing escape of lubricant, means for holding the shaft, spindle member and collar member in assembled relation, and means on the collar member for effecting a driving connection thereto.

References Cited in the file of this patent

UNITED STATES PATENTS

| | | |
|---|---|---|
| 1,636,262 | Troendiy | July 19, 1927 |
| 2,507,999 | Schjolin | May 16, 1950 |
| 2,518,481 | Maguire | Aug. 15, 1950 |
| 2,550,580 | McLeod | Apr. 24, 1951 |

FOREIGN PATENTS

| | | |
|---|---|---|
| 263,229 | Great Britain | Dec. 24, 1926 |
| 516,667 | Great Britain | Jan. 9, 1940 |